United States Patent

Sakuraba et al.

Patent Number: 5,452,448
Date of Patent: Sep. 19, 1995

[54] METHOD OF REPLICATE FILE UPDATING BY MONITORING FILE ACCESSES AND SYSTEM THEREFOR

[75] Inventors: Taketoshi Sakuraba; Junji Fukuzawa, both of Sagamihara; Takaki Kuroda, Yokohama, all of Japan

[73] Assignee: Hitachi, Ltd., Tokyo, Japan

[21] Appl. No.: 29,130

[22] Filed: Mar. 10, 1993

[30] Foreign Application Priority Data

Mar. 16, 1992 [JP] Japan ............ 4-090248

[51] Int. Cl.$^6$ .............. G06F 17/30; G06F 13/00
[52] U.S. Cl. ............. 395/600; 364/962.1; 364/966.5; 364/DIG. 2
[58] Field of Search ............ 395/650, 600, 575

[56] References Cited

U.S. PATENT DOCUMENTS

| | | | |
|---|---|---|---|
| 4,558,413 | 12/1985 | Schmidt et al. | 364/300 |
| 4,771,375 | 9/1988 | Beglzn et al. | 395/425 |
| 5,018,060 | 5/1991 | Gelb et al. | 395/600 |
| 5,089,958 | 2/1992 | Horton et al. | 395/575 |
| 5,138,710 | 8/1992 | Kruesi et al. | 395/575 |
| 5,267,867 | 4/1994 | Kenley et al. | 395/600 |

*Primary Examiner*—Thomas G. Black
*Assistant Examiner*—Peter Y. Wang
*Attorney, Agent, or Firm*—Fay, Sharpe, Beall, Fagan, Minnich & McKee

[57] ABSTRACT

A read/write replica of a file in a file server is updated through a communication line by a client. At the same time, a replica server detects the update data by using a virtual communication line between the client and a read-only replica of the file. The update data are used for refreshing the read-only replica. The refreshing process makes it unnecessary to send the update data from the file server to the replica server. Also, communication is made between the file server and the replica server to confirm validity of the update information taken in by the replica server to maintain equality of the files of the file server and the replica server. This can efficiently refresh the read-only replica of the replica server in a distributed data processing system without re-sending the update data.

11 Claims, 6 Drawing Sheets

METHOD OF REPLICATE FILE UPDATING BY MONITORING FILE ACCESSES AND SYSTEM THEREFOR

BACKGROUND OF THE INVENTION

1. Field of the Invention

The present invention relates to a replicate file updating method and system appropriate for effective use of a replicate file in a distributed data processing system.

2. Description of the Prior Art (1) Snoop cache

A snoop cache, for example, is described in an article entitled "Parallel Processing Mechanism" in the Volume of Electronics, Information and Communication, MAT, Maruzen Inc., pp. 167–207, 1989.

In a microprocessor system of which each processor has a respective cache memory and is made to access to a common main memory, data existing at the same addresses in the main memory are copied into the cache memory of each cache memory before access.

In the system, if any of the processors updates the main memory, the other processors may have the data at the updated address in the cache memory. Then, coherency must be maintained among the caches in a way such as invalidating the data. The snoop cache is a cache control feature for the purpose, or a cache memory making use of the control feature.

In the multiprocessor system having the processor connected through a bus, the snoop cache functions as follows. If any of the processors updates the main memory, the cache control circuit of each processor monitors the bus to know of the updated address. If the cache memory has the corresponding data, it invalidates them to maintain the coherency. In the snoop cache, monitoring of each processor is to write in the memories of the other processors having the feature equivalent to it.

The article mentioned above explains about a cache update protocol of write broadcast type on pages 196 and 197. With the protocol, if any of the other processors has data in its own cache to update the memory, the cache is not invalidated, but the data are immediately written in the corresponding cache.

A system having the snoop cache used features a high bus reliability. It also features that memory update by any processor can be dependably transferred to the other processors. Maintenance of the coherency in each snoop cache, thus, can be readily started.

(2) Distributed file system

The distributed file system has a plurality of data processing systems, such as personal computers or workstations, connected to a communication network called a LAN (local area network). Any of the data processing systems can perform its work while receiving information from or sending to another system through the communication network. There is an important technique in the distributed data processing system which is a distributed file system. The distributed file system makes it possible to access from any of the data processing systems in the communication network to any of the files existing in another data processing system. It also makes it possible for a plurality of data processing systems to use the files existing in one data processing system in common. The data processing system having the files used in common is referred to as the file server here. The data processing system which can access to the common file in the file server is referred to as a client.

If a specific common file is frequently accessed, many access requests are concentrated in the file server. The concentration may become a bottle neck in the whole characteristic performance of the distributed data processing system. In order to solve the problem of bottle neck, a copy of the file is placed in a second file server so that the second file server can process parts of the access requests to the file to distribute the load in the two file servers. With the copy of the same file put in a plurality of data processing systems, the copy can be alternatively used even if the original file is destructed. The access to the file, thus, cannot be interrupted or can be easily restored, thereby increasing the reliability of the whole distributed data processing system. Each copy of the same file is called the replica of the file, or the replicate file. Preparing the copy is called replication.

The distributed file system is described in the ACM, Computing Surveys, vol. 22, No. 4 (1990), pp. 321-374. The replication is explained on pages 339 and 340 in the article.

As described in the article mentioned above, the replication involves a problem of update method of a plurality of replicas. A prior update method of similarly updating all the replicas at the time of update can maintain equality of the replicas. This, however, causes too high overhead. Another prior method of not maintaining the equality of the replicas at all is good in view of availability and performance. This, however, cannot maintain correctness of the process results as the equality is broken.

Still another prior typical method is as follows. There are provided a single read/write replica and a plurality of read-only replica. Update contents for the read/write replica are transferred to the data processing system having the read-only replica afterwards to refresh the read-only replica. The latest status of the read/write replica, that is, is reflected to the read-only replica while the atomicity is being maintained. This method temporarily breaks the equality of the replicas. It, however, can restore the equality in a certain time so that consistency of the data of the file can be maintained. The method, thus, is available, particularly for the read-only file or the file which is very rarely updated.

The file server having the read/write replica is hereinafter referred to as the file server (of the file) for simplicity of description. The file server having the read-only replica is hereinafter referred to as the replica server (of the file) for simplicity of description. The terms "file server" and "replica server" have their concepts given with specific files determined. A data processing system which is a file server for the specific file can be a replica server for another file.

A file in which writing is frequently made increases refreshment of the read-only replica. Update data transfer due to the refreshment is increased. As a result, the file server having the read/write replica causes overhead of the updated file or update data sending process. It also causes a new load on the communication line. The busy rate rises. If there are a plurality of replicas provided for one file, the overhead is increased by a number of the replicas as compared with that of no replica.

The overhead of the file server can be relaxed by using a plurality of file servers to distribute the load. It however is not easy to relax the load on the communication line as this is only one resource for the distributed data processing system. Scalability is one of measures of evaluating the distributed data processing system. The communication line is one of the bottle necks for the scalability. That is, there exists tradeoffs in the availability of the file by replication and between the reliability increase and system scalability. It is a problem to solve them.

SUMMARY OF THE INVENTION

In view of the foregoing, it is an object of the present invention to provide an efficient and reliable replicate file updating method and system with less overhead in updating a replica in a file server and without generation of load on a communication line.

Accordingly, the present invention provides a replicate file updating method and system in a distributed data processing system including a communication network and at least three kinds of processing systems connected with the communication network, at least one third kind of processing system being capable of access to replicate files of the first and second kind of processing systems.

The second kind of processing system is characterized in monitoring an access made by the third kind of processing system to the second kind of processing system itself through the communication network and for monitoring a communication made on the communication network between the third processing system and the first kind of processing system for updating the replicate file in the first kind of processing system, in detecting the access before detecting whether or not the second kind of processing system has the same replicate file as the file to be updated, in making the second kind of processing system take update contents thereinto sent from the third kind of processing system to the first kind of processing system if the second kind of processing system has the same replicate file, as a result of the detection, and in updating the replicate file by the the second kind of processing system according to the update contents taken in.

The present invention will be further explained in detail below in connection with its embodiments. Communication between the file server and the client accompanying update of the read/write replica is monitored by a replica server which is the data processing system having read-only replica. If it sees the writing, the replica server takes in the writing contents before refreshing the read-only replica.

Also, the replica server judges validity of update contents using a number of times of update of the file to be updated or validation data when the read-only replica of the replica server is updated. The judge is made by confirming through communication with the file server that the number of times of update of the file to be updated or the validation data obtained by the replica server is equal to the number of times of update of the file to be updated or the validation data obtained by the file server.

If it confirms the validity, the replica server refreshes the read-only replica, or performs update. If it detects an error, the replica server makes the file server send the replica of the latest status again. Using this, the replica server updates the read-only replica.

As a result, the present invention provides the following features and operations.

The replica server takes in update information received or sent at the time of the update process of the read/write replica in the file server as the update data to refresh the read-only replica. Using the update information, the replica server updates the read-only replica. For the reason, the file server is not needed to re-send the update information to refresh the read-only replica. This means that the load on the communication network can be minimized.

Also, the replica server can receive from or send to the file server the number of times of update of the file to be updated or the validation data which represents the update information needed to refresh the read-only replica well with far shorter data than the whole update information. The replica server checks equality of the numbers of times of update or the validation data obtained by the two servers to confirm validity of the data. This can overcome possible data error caused in the communication network and the like.

If it confirms the validity, the replica server executes refreshing the read-only replica without re-sending the update information as in the above. The data used in the confirmation do not cause any problem in increasing the load on the communication network as they are very small. As a result of the validity confirmation, an error of the latest data may be found. Then, the replica server has all the contents of the read/write replica or the update information needed for refreshment sent from the file server before executing refreshment of the read-only replica. This method cannot relax the loads on the file server and the communication network. However, the method provides a sufficiently high load reduction effect as an error occurrence rate is very low. It also provides the reliability equivalent to the one of the system to which the present invention is applied.

The foregoing and other objects, advantages, manner of operation and novel features of the present invention will be understood from the following detailed description when read in connection with the accompanying drawings.

DETAILED DESCRIPTION OF THE INVENTION

The following describes in detail embodiments according to the present invention by reference to the accompanying drawings.

Figure 1:
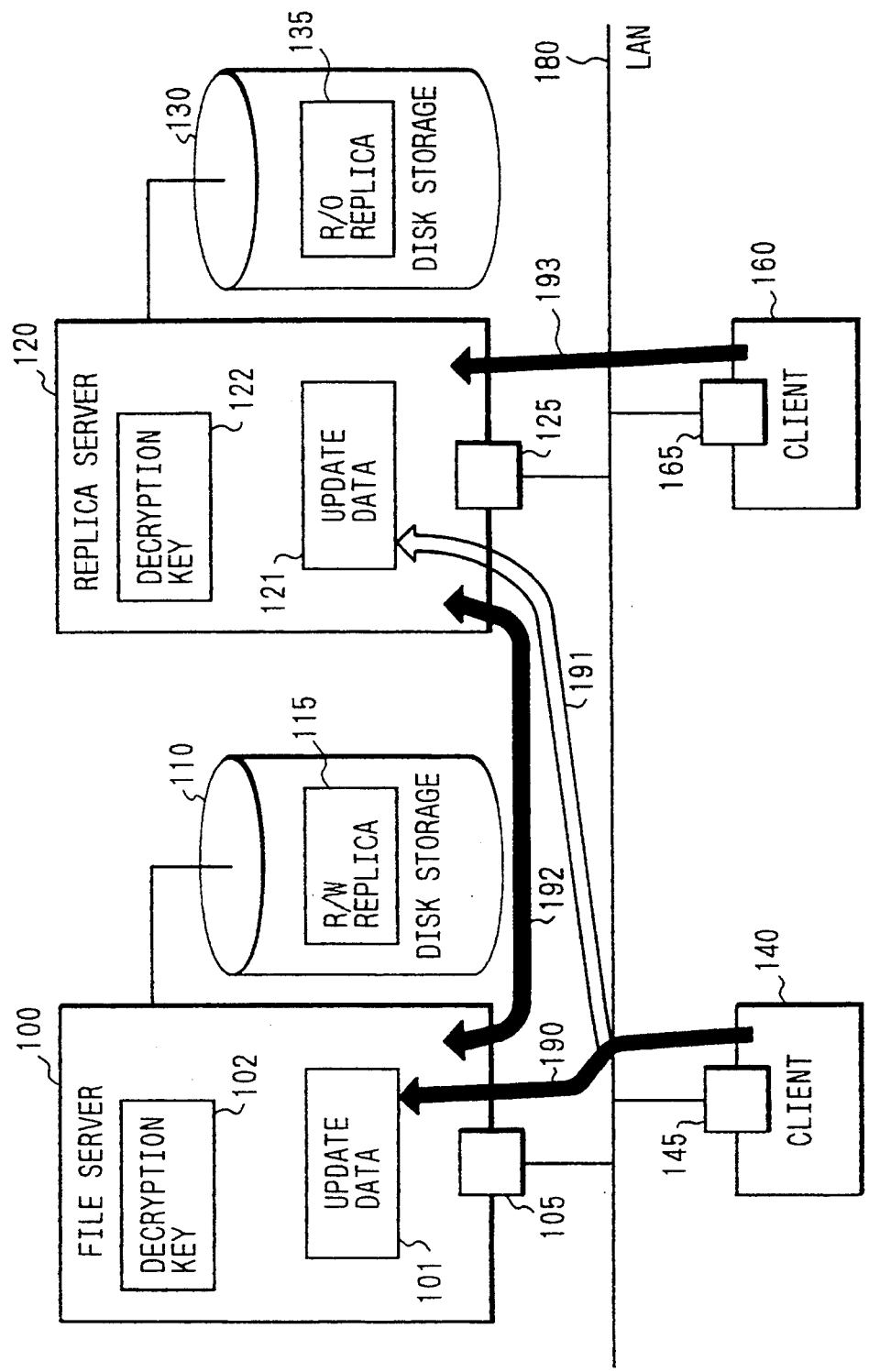
FIG. 1 is a block diagram for a distributed data processing system used in a first embodiment according to the present invention.

FIG. 1 is a block diagram for a distributed data processing system of a first embodiment of the present invention. That distributed data processing system comprises independent data processing systems, including a file server 100, a replica server 120, a client 140, and another client 160. The file server 100 has a read/write replicate file (replica). The replica server 120 has a read-only replicate file. The first client 140 is accessible to the replicate file held in the file server or replica server. These data processing systems are connected to a common LAN 180 through their respective interface boards 105, 125, 145, and 165. The systems can communicate and transfer data between themselves.

As a typical construction, the distributed data processing system uses high-performance workstations (WSes) for the file server 100 and the replica server 120, standard-performance, low-cost WSes or personal computers (PCs) for the client 140 and the client 160, and a local area network (LAN).

The file server 100 and replica server 120 have a disk storage 110 and a disk storage 130 for storage of files, respectively. The files can be accessed in common from the clients 140 and 160.

In consideration of a specific fixed file, a read/write (R/W) replica 115 of the file is stored in the disk storage 110 of the file server 100. A read-only (R/O) replica 135 of the file is stored in the disk storage 130 of the replica server 120. In order to distribute file transfer process overhead to the file server 100 and the replica server 120, the client 140 can read the file onto the read/write replica 135 of the file server 100, and the client 160 can read the same file onto the read-only replica 135 of the replica server 120.

The client 140 can request the read/write replica 115 to update as the read/write replica 115 is enabled to read/write the replica. Updated data 101, or new data updated of the file, is transferred from the client 140 through a virtual communication line 190 formed of a communication lines 145, 180, and 105. Following to the update request, the file server 100 updates the read/write replica 115 of the file. At this time, there occurs an inequality of data between the read/write replica 115 and the interface board 125. The data must be made equal in some method at a proper instance in future.

Communication through the LAN is made according to a protocol which is a communication agreement between any of the sending and receiving data processing systems. The protocol includes an addressing method which is a method for designating the receiving data processing system. The data transfer itself is made by generation or detection of an electric signal on the communication line 190, while the communication is made by the data processing system which reads address data contained in the electric signal detected by the data processing system before judging whether or not the communication is given to itself.

In this first embodiment, the interface board 125 of the replica server 120 makes it possible not only to do the communication itself to the replica server 120, but also to take the communication to the file server 100 therein to know of the update of the read/write replica and its data. This can be made as the electric signal on the LAN 180 is detected at the interface board 125 as well as at the interface board 105. In other words, a communication line 191 makes it possible to monitor transmission of the updated data to the file server 100 as the communication line 191 exists actually from the client 140 to the replica server 120. Updated data 121 is used to refresh the read-only replica 135.

The distributed data processing system may encrypt data of the communication for its security. The file server 100 can communicate update data 101 as it knows of a decryption key 102 in advance. However, even if the replica server 120 takes data therein, the replica server 120 cannot correctly use the data as the updated data as they were. The file server 100 therefore has had to send the decryption key 102 to the replica server 120 in advance. The replica server 120 keeps the decryption key 102 therein as a decryption key 122 for itself. The replica server 120 can use decryption key 122 to decrypt the update data 121 to update the replica correctly.

Figure 2:
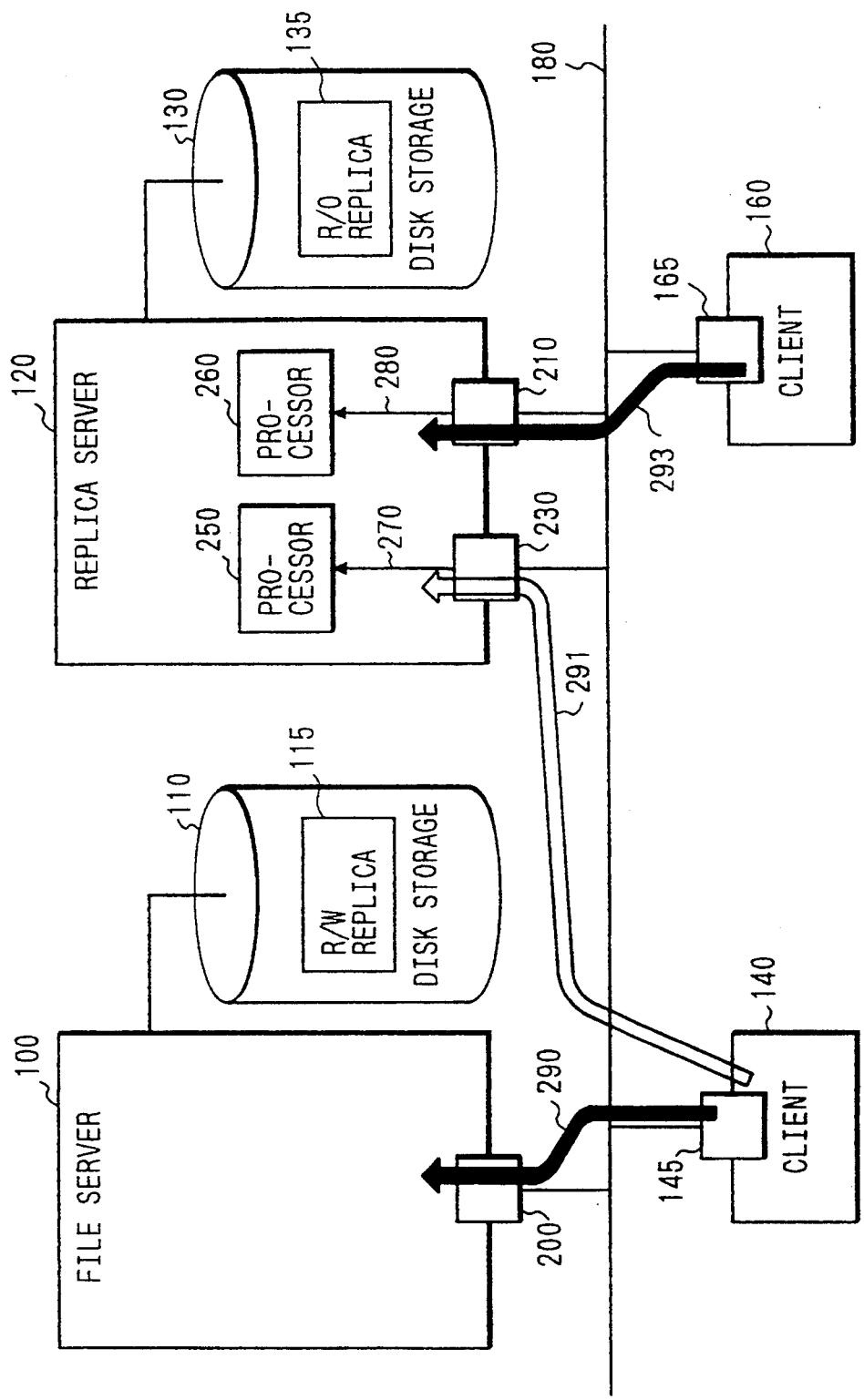
FIG. 2 is a block diagram for a second embodiment of the replica server shown in FIG. 1.

FIG. 2 is a block diagram for another distributed data processing system of a second embodiment of the present invention. This second embodiment has an interface board 230 for taking a communication of the file server 100 into the replica server 120 in addition to an original interface board 210 for accepting another communication to the replica server 120. This makes it possible to monitor the communication more reliably.

The interface board 210 which is an interface with the LAN 180 processes a destination address of the communication and electric connections of the connection as well. In other words, if the destination address is its own address, the interface board 210 takes communication data therein, and makes an interruption 280 to a processor 260 of the replica server 120 to make the replica server 120 to process the communication data. If updating is made by the file server 100 while the communication data are being processed, the processor 260 of the replica server 120 may fail to take the updated data.

In order to monitor the communication of the file server 100, there is provided the interface board 230 for monitoring the communication of the file server 100 only in addition to the interface board 210 specific to the replica server 120. In order to process the data taken by the interface board 230 reliably, there is further provided a processor 250 for the data processing only. For processing the monitoring data, these should be arranged so as to always interrupt processor 250. This accomplishes more dependable characteristic performance. If the client 140 starts communication with the file server 100, a communication line 291 is virtually formed of the communication lines 145 and 180 and a communication line 230. The communication line 291 corresponds to the communication line 191 shown in FIG. 1.

Relationship between the processor 250 and processor 260 is as follows.

The processor 250 monitors updating of a file by the read/write replica 115 in the file server 100. While the processor 250 is taking update data of the file, the processor 260 can continue execution of ordinary processes including services with use of the replica.

In a version-up process of the read-only replica 135, it may occur that a replacing process of the old replica with the new one may be executed in parallel with the update process of the file in the file server 100, although that parallel execution depends on a control method of the distributed file system. The update has to be reflected to a version following the new replica being created in the replica server 120. Taking the update data must be successively made.

For the replica server 120 having the plurality of processors including the update data take-only processor 250, the version-up process of the replica is made in a way that the ordinary processing processor 260 creates the new replica, while the processor 250 continues to monitor the update of the replica. At a stage that the version-up process is started, therefore, the processor 250 for a preceding update data buffer has to be replaced by the processor 260 at the same time the update data buffer is replaced. This needs that the both processors have to be synchronized.

Figure 3:
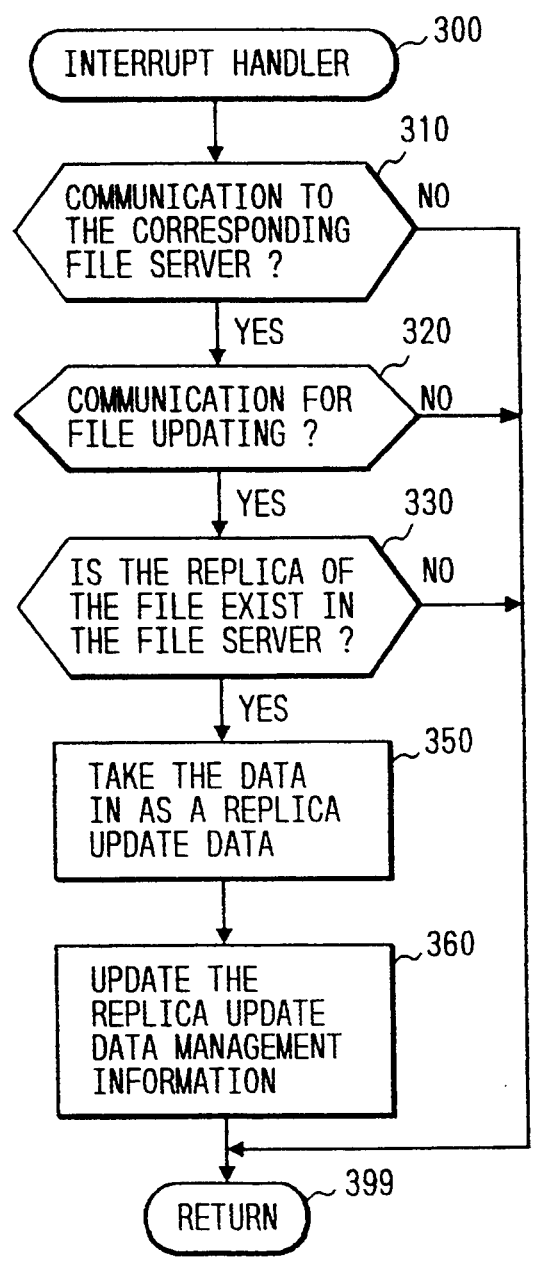
FIG. 3 is a flow chart for a data take-in process of the replica server in the first embodiment.

In turn, the following describes how the replica server 120 processes the file communication data. The interface boards 210 and 230 of the replica server 120 takes the communication data therein when the LAN 180 starts the communication. At the same time, the interface boards interrupts the processors of the replica server 120 to request to process. FIG. 3 is a flow chart for the interrupt process. An interrupt handler 300 in the figure proceeds as follows. Step 310 checks the data contents taken as described above or the interrupt information. Step 310 also judges whether or not the data are related to the file in the read-only replica of the replica server and judges whether or not the data are related to the communication with either file server having the read-only replica. If the communication is with the corresponding file server, control goes to step 320. Step 320 checks whether the communication data are related to file updating or not. If so, control goes to step 330.

Step 330 checks whether or not the file to be updated is the file that the replica server has the read-only replica. If so, control goes to step 350.

Step 350 takes in and stores the data mentioned above as the update data. Step 360, further, creates or updates the replica and the replica update data management information. These replica and the replica update data management information are used to refresh the read-only replica afterwards.

Figure 4:
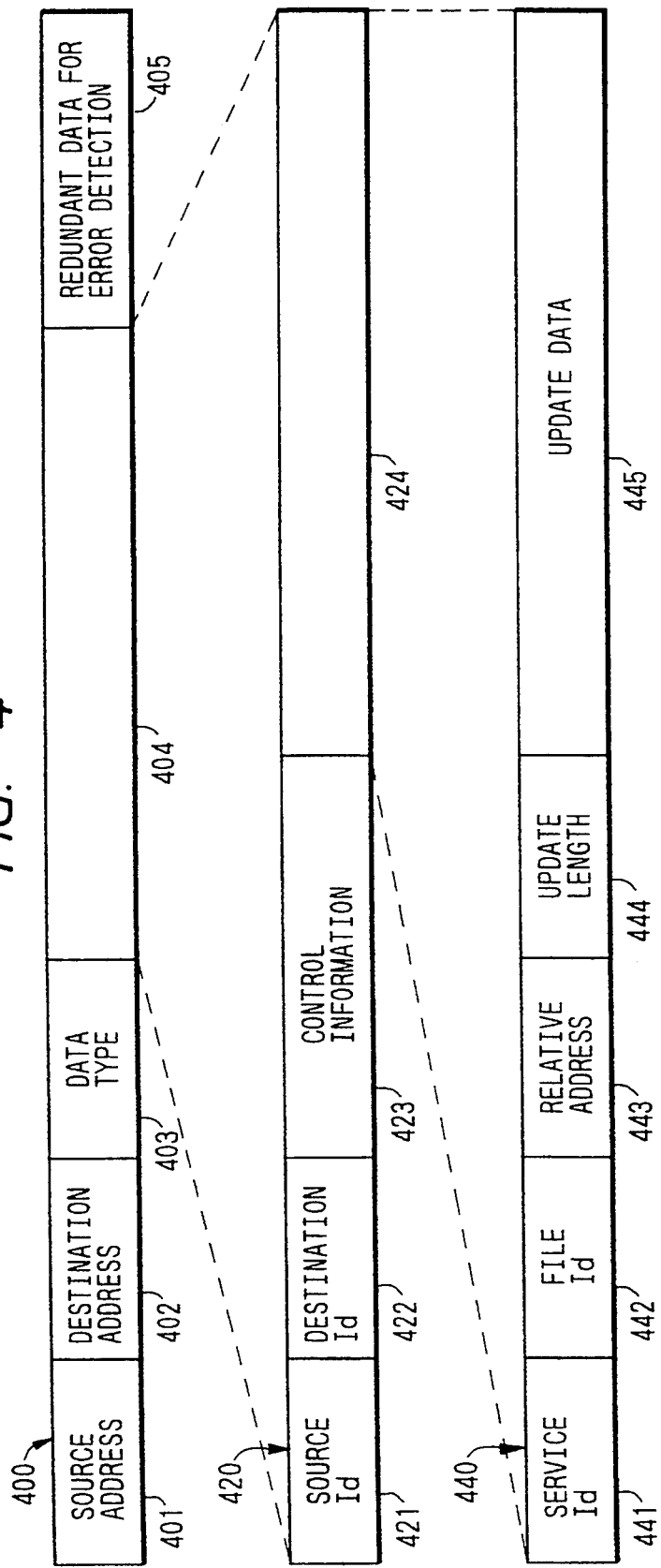
FIG. 4 shows an example of structure of communication data used in a replica take-in process memory in the first embodiment.

In turn, the following describes about the data for use in the judgement processes at steps 310, 320, and 330. FIG. 4 shows an example of structure of communication data taken in memory at the time of interruption. The data are of nesting structure corresponding to a process level at which they are looked up. A data structure field 400 is a structure when the data are transmitted on the LAN 180. The data structure field 400 contain a source address field 401, a destination address field 402, a data type field 403, a data body field 404, and redundant data field 405 for error detection.

Step 310 can look up the destination address field 402 to judge whether or not the communication data are communicated to the file server related to themselves.

The data body field 404 of the data structure field 400 contains a data sub-structure field 420 for use in a higher level process. The data sub-structure field 420 contains a source ID field 421, a destination ID field 422, a control information field 423, and data field 424 to be transferred to the higher level process. The destination ID field 422 represents a feature to receive the communication or a program. The ID field 422 makes it possible to find that the communication is to the file server 100. This is because the replica server 120 knows what a destination ID a control program of the file server 100 should have.

The data field 424 is of a data structure field 440. A service ID field 441 has contents of a service request shown for the control program of the file server 100. Being looked up, the ID field 441 makes it possible to find whether the file should be updated or not. Step 320, therefore, looks up the fields 422 and 441 to judge that the file is requested to update.

For the file update request, the data structure field 440 has fields, including a file ID field 442 of the file to be updated, a relative address field 443, an update length field 444 indicating an update range, and an update data field 445 having the contents themselves to be updated. The replica server 120 has a management table for the replica stored therein. Step 330, thus, can judge whether or not the replica server 120 has the replica of the file indicated by the file ID field 442. The fields 443, 444, and 445 indicating the update contents are used by step 350. Parts of the update contents are stored in the disk.

In turn, the following describes as to validity of the update data. The update data of the replica are independently taken in by the replica server 120 and the file server 100 for use to update. In particular, the file server 100 uses a proper protocol with the client 140 having requested the update for reliable data transfer. The replica server 120, on the other hand, has not always a maintenance of validity of the updated data taken in, as the replica server 120 monitors the communication only. If the data can be taken in, validity of the data can be maintained to a certain degree.

However, if the replica server 120 is overloaded, for example, this may cause a monitoring omission in the communication of the file server 100. The updated data may be partly lost. It, therefore, is desirable to use some method that the file server 100 can be participated in the validity check of the updated data taken in by the replica server 120.

An example of the method is as follows. Suppose the redundant data 405 for error detection of the taken-in data be effective. In addition to checking the data every time of update, it should be confirmed that the file server 100 and replica server 120 are equal in numbers of times of the updates. We, then, can determine that the validity of the updated data taken in by the replica server 120 is maintained.

As an example, let us consider a number of updates (a first update, a second update, a third update, and so on) of a file A stored in the file server 100 and the replica server 120 after at an instance. Each of the updates may be for the whole file A. Otherwise, partial updates may be done in a way that the first update should be for 20 bytes, a former part of the file A; the second update should be for 30 bytes, a latter part of the file A; and the third update should be for 40 bytes, a central part of the file A.

Besides, we may feel an anxiety that the validity of the redundant data for error detection may not be sufficient. We also may feel another anxiety that only the equality of the number of times may not be sufficient to prove valid. We, then, have to make both the file server 100 and replica server 120 create validation data depending on the updated data before confirming the equality of the both data. The communication for the validation has to be far smaller than the updated data. This is a condition for an object of the present invention that is to reduce the load on the communication network (LAN).

The both redundant data for error detection of the current updated data are sent as the validation data before being compared with. This can detect inequality. If unequal, the replica server 120 should have only the updated data sent at the time the redundant data for error detection are unequal. This can make the amount of data to transfer less than all the updated data to send.

Figure 5:
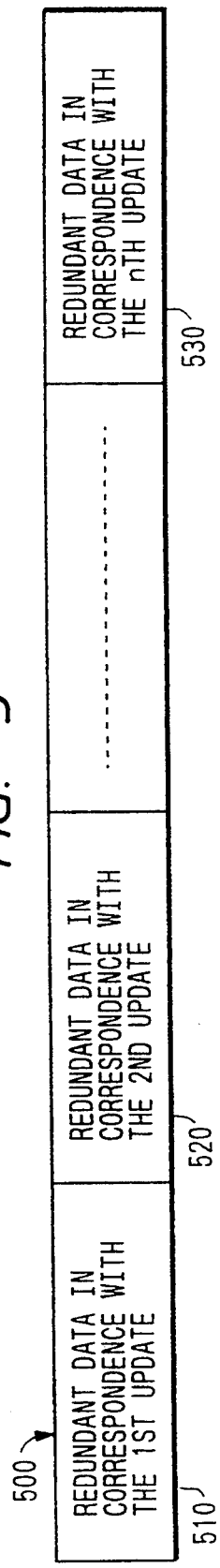
FIG. 5 shows a structure of validation data in the first embodiment.

FIG. 5 shows a structure of the validation data.

The validation data 500 comprise redundant data fields 510, 520, and so on for error detection in correspondence with the updated data. The redundant data fields are from the first to latest update as counted after the preceding version-up. As an example, the equality of the replica can be maintained by transferring to the replica server 120 the updated data only at the time of the second update.

Another validation method is as follows. Both the file server 100 and the replica server 120 should be made to generate the redundant data for error detection as to update contents after an nth update. The file server 100 should transfer only the redundant data for error detection as validation data. Equality of the redundant data for error detection, then, should be confirmed. This method makes the file server 100 send to the replica server 120 the updated data until the nth time even if an error occurs in the course or even if parts of the updated data are missed. This overwrites the data. If the contents are finally equal, the file is so useful as replica to effectively reduce the loss due to an error, particularly in no need of the condition that the number of times of updating must be used as data for validation of the updated data.

Figure 6:
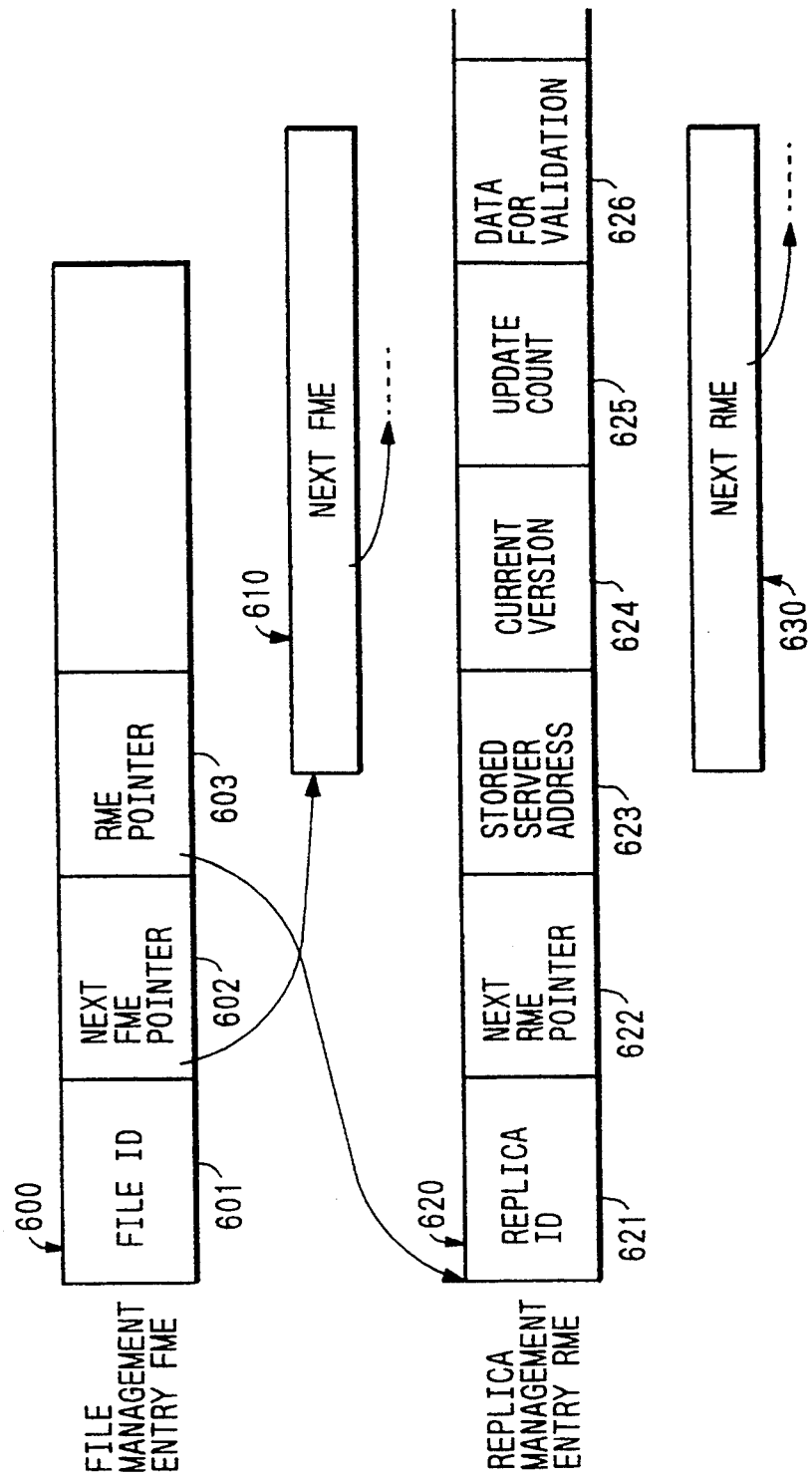
FIG. 6 shows a file and a replica management data in the first embodiment.

In turn, the following describes as to a replica management table for use in the file server. FIG. 6 shows a file management entry (FME) field 600 and a replica management entry (RME) field 620 for management of its replica. They are all of chain structure as there exist pluralities of files and replicas to be managed. The FME field 600 includes a file ID field 601 of the file that the entry manages and an RME pointer field 603 for the RME field 620 of the replica of the file. The RME field 620 includes a replica ID field 621, a stored server address field 623 of a data processing system having the replica, a current version field 624 indicating a current status of the replica, an update count field 625 indicating a number of times of update after replication of the version, and a validation data field 626 featuring a course of update.

Figure 7:
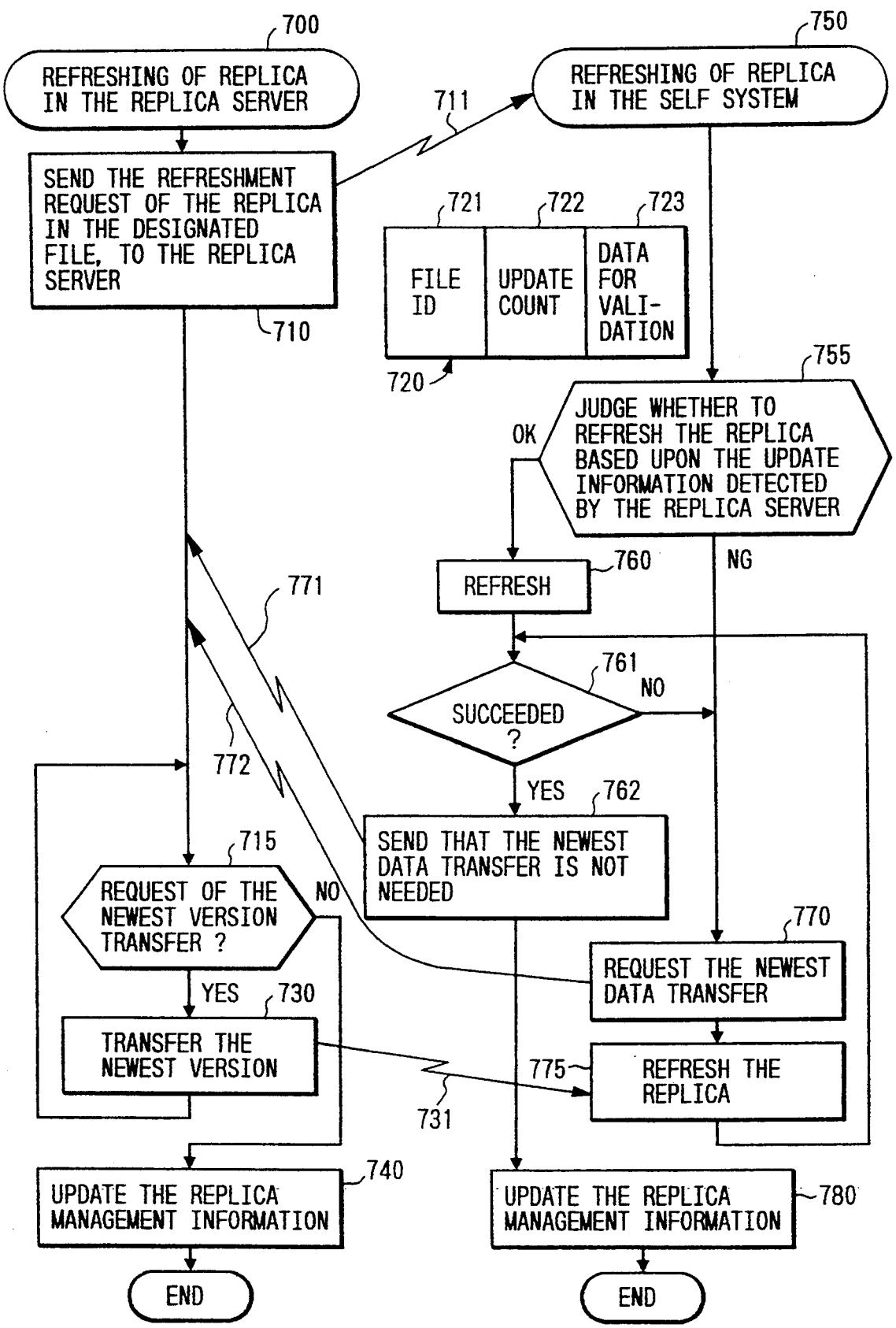
FIG. 7 is a flow chart for a replica refreshing process in the first embodiment.

In turn, the following describes as to a process for refresh the read-only replica in the replica server 120. FIG. 7 is a flow chart for a process 700 of the file server 100 in an embodiment of the process for refreshing the read-only replica in the replica server 120 and for a replica refreshing process 750 in the replica server 120. In the figure are shown keyed arrows 711, 731, 771, and 772 which indicate communications between the both servers. In the figure are also shown a data field 720 sent through the communication 711. In this embodiment, suppose the refreshing process of the read-only replica be started by the file server 100.

First, the file server 100 issues a refresh request to the replica server 120 through the communication 711 at step 710. The communication 711 sends the data field 720, including a file ID field 721 of the replica to be refreshed, an update count field 722 of the read/write replica of the file after the preceding refreshment and if necessary, a validation data field 723 for the updated data. The update count field 722 and the validation data field 723 use the update count field 625 and the validation data field 626 of the replica management entry (REM) field 620 in the file server 100.

The communication 711 starts the replica refreshing process 750 in the replica server 120. The replica server 120 compares the update count field 722 and the validation data field 723 sent at step 755 with the update count made or generated in the replica server 120 and the validation data. This is to evaluate validity of the updated data in the replica server 120. If the validity is confirmed, control goes to step 760.

Step 760 refreshes the read-only replica in the replica server 120 by using the updated data taken in by the replica server 120. If the refreshing process is succeeded, step 762 sends through the communication 771 that the latest data are not needed to send from the file server 100. Step 780 updates the replica management information before ending the refreshing process. If the refreshing process fails, control goes to step 770.

If the validity of the updated data taken in by the replica server 120 at step 755 is not confirmed and if failure of the refreshing process is judged, then step returns the response 772 that requests the file server 100 to send the latest version of specified data.

The file server 100 checks the responses 771 and 772 given from the replica server 120 at step 715. If they are not the send request of the latest version, or if refreshing the replica in the replica server 120 is completed, then step 740 updates the replica management information before ending the process.

If step 715 finds that sending the latest version is requested, control goes to step 730. The latest version is sent through the communication 731. The process is returned to step 715 again. Step 715 confirms that the refreshing the replica in the replica server 120 is completed before ending the process through step 740.

The replica server 120 refreshes the replica at step 775 by using the updated data given through the latest version transfer 731. Step 775 then goes to step 761. Step 762 responds with the refreshing process end through the communication 771 before ending the process.

In turn, the following describes about differences between the present invention and the maintenance method of the cache coherence of the snoop cache.

The snoop cache uses a data update source provided in a processor. Monitoring the bus is made by the other processor having functions similar to those of the update source processor. An object to be updated is the memory which is an entity different at the level from the processor. On the other hand, the present invention uses the client as the update source. Monitoring the communication lines is made by the replica server. The object to be updated is the read/write replica provided in the file server having the functions similar to those of the replica server. That is, the two methods are basically different in the structure. One is that monitoring is made at the equivalent level as the update request source, while the other is that monitoring is at the equivalent level as the updated object.

The snoop cache underlines that in the cache update, the update data taken in as results of monitoring are immediately reflected to the cache. On the other hand, the present invention features that the update data taken in as results of monitoring are stored in the proper memory. This makes it possible that the read-only replica is refreshed even after the data have been updated a plurality of times. That is, the two methods are different to a great extent in the reflection of the data taken in.

Further, the present invention features that in refreshing the data, validity of the updated data taken in is confirmed through communication with the file server. This feature accomplishes a highly reliable replication.

A feature of the present invention is that the update contents can be taken in at the same time the read-write replica is updated. This makes it possible that in refreshing the read-only replica, it is not needed to re-send the updated contents from the file server to the replica server. Another feature of the present invention relates to refreshing the replicate file that can be made without increasing the loads on the file server and the communication network. Still another feature of the present invention relates to confirmation of the validity of the update information at the time of updating the replica through communication with the file server. This makes it possible to maintain the equality of the replicas at a high level. It, thus, accomplishes a highly reliable replication.

What is claimed is:

1. A replicate file updating method in a distributed data processing system including a communication network and at least three kinds of processing systems connected through said communication network, at least a third kind of said processing systems for accessing files of a first and a second kind of said processing systems, comprising:

a step performed by the second kind of processing system of monitoring a communication made between said third kind of processing system and said first kind of processing system for updating a file in said first kind of processing system by acquiring updating contents from the third kind of processing system;

a step of detecting said communication for detecting whether or not said second kind of processing system has a replicate file of the file to be updated;

a step of making said second kind of processing system also take in the acquired update contents thereinto sent from said third kind of processing system if said detecting step detects that said second kind of processing system has the replicate file; and a step of updating said replicate file in said second kind of processing system, with the updating contents.

2. A replicate file updating method in a distributed dam processing system including a communication network, at least one file server and at least one replica server both connected through said communication network, and at least one data processing system (client) for accessing a file of said file server and said replica server, connected through said communication network comprising:

a step performed by said replica server of monitoring a communication made between said client and said file server for updating a file in said file server, by acquiring updating contents from the client;

a step of detecting said communication for detecting whether or not said replica server has a replicate file of the file to be updated in said file server;

a step of taking into the replica server the acquired updating contents sent from said client to said file server if said replica server detects that the replica server has the replicate file therein; and a step performed by said replica server, of updating said replicate file with the updating contents.

3. The replicate file updating method according to claim 2, further comprising:

a step performed by said file server and said replica server of obtaining a number of file updating times indicating a number of file updating times obtained in each server;

a step performed by said replica server, of comparing the number of file updating times in said replica server with a number of file updating times in said file server; and a step performed by said replica server, of updating the replicate file with the updating contents, if the numbers of file updating times are equal as a result of performing the comparing step.

4. The replicate file updating method according to claim 3, further comprising, if the numbers of file updating times are not equal, as a result of performing the comparing step:

a step performed by said replica server, of sending an update contents send request to said file server; and a step of receiving the update contents sent from said file server for updating the replicate file with the update contents received.

5. The replicate file updating method according to claim 3, further comprising:

a step performed by said file server and said replica server of generating validation data indicating that the update contents taken in are valid;

a step performed by said replica server of comparing the validation data generated by said replica server, with the validation data sent from said file server; and a step performed by said replica server, of updating the replicate file with the update contents taken in if the validation data are equal as a result of performing the validity comparing step.

6. The replicate file updating method according to claim 5, further comprising, if at least one inequality is met as a result of the number of updating times comparing step and the validity comparing step wherein said at least one comprises an inequality of the numbers of file updating times and an inequality of the validation data:

a step of sending an update contents send request to said file server; and a step of receiving the update contents sent from said file server for updating the replicate file.

7. The replicate file updating method according to claim 2, wherein the detecting step further comprises:

a first detection step for detecting the access; and a second detection step for detecting whether or not said replica server has said replicate file.

8. The replicate file updating method according to claim 7, wherein said replica server has at least two processors which individually perform processes for an access from said client and processes for the replicate file in the replica server.

9. The replicate file updating method according to claim 2, further comprising:

a step performed by said replica server for storing encryption/decryption information sent from said file server to said replica server; and a step of taking in the updating contents sent from said client to said file server with the encryption/decryption information.

10. A replicate file updating system comprising:

a communication network;

at least three kinds of processing systems connected with said communication network;

at least a third kind of said processing system for accessing files of a first and a second kind of said processing systems;

said second processing system having:

means for monitoring a communication made between said third kind of processing system and a first kind of processing system for updating a file in said first kind of processing system, by acquiring updating contents from the third kind of processing system;

means for detecting said communication for detecting whether not said second kind of processing system has a replicate file of the file to be updated;

means for making said second kind of processing system take the acquired updating contents thereinto sent from said third kind of processing system to said first kind of processing system if said second kind of processing system detects the replicate file therein; and means for updating said replicate file in said second processing system, with the updating contents.

11. A replicate file updating system comprising:

a communication network;

at least one file server and at least one replica server both connected with said communication network;

at least one data processing system (client) for accessing a file of said file server and said replica server connected through said communication network;

said replica server having:

means for monitoring a communication made between said client and said file server for updating a file in said file server, by acquiring updating contents from the client;

means for detecting said communication for detecting whether or not said replica server has a replicate file of the file to be updated in said file server;

means for taking in the acquired updating contents sent from said client to said file server into said replica server if said replica server detects the replicate file therein; and means for updating said replicate file with the updating contents.

* * * * *

UNITED STATES PATENT AND TRADEMARK OFFICE
CERTIFICATE OF CORRECTION

PATENT NO. : 5,452,448
DATED : September 19, 1995
INVENTOR(S) : Taketoshi Sakuraba, et al.

It is certified that error appears in the above-indentified patent and that said Letters Patent is hereby corrected as shown below:

Claim 1, column 11, line 15, delete "systems" and insert therefor --system--.

Claim 2, column 11, line 27, delete "dam" and insert therefor --data--.

Signed and Sealed this

Twenty-first Day of November, 1995

*Attest:*

BRUCE LEHMAN

*Attesting Officer*  *Commissioner of Patents and Trademarks*